United States Patent [19]

Reed

[11] Patent Number: 4,635,856

[45] Date of Patent: Jan. 13, 1987

[54] HAND-OPERATED SPRAYERS

[75] Inventor: William J. Reed, Birmingham, England

[73] Assignee: Associated Sprayers Limited, Birmingham, England

[21] Appl. No.: 660,142

[22] Filed: Oct. 12, 1984

[51] Int. Cl.[4] .......................... B05B 1/30; B05B 1/14; F16K 39/00

[52] U.S. Cl. .................................... 239/583; 251/340; 251/344; 251/900; 239/569; 239/590

[58] Field of Search ............... 239/583, 584, 569, 590, 239/590.5; 251/353, 354, 340, 900, 344, 347, 318

[56] References Cited

U.S. PATENT DOCUMENTS

| | | | |
|---|---|---|---|
| 254,048 | 2/1882 | Robertshaw | 239/590.5 |
| 889,952 | 6/1908 | McGinley et al. | 251/353 |
| 2,030,510 | 2/1936 | Griffiths | 251/340 X |
| 2,939,675 | 6/1960 | Kårdén | 251/242 |

FOREIGN PATENT DOCUMENTS 2084258 4/1982 United Kingdom .

*Primary Examiner*—Joseph F. Peters, Jr.
*Assistant Examiner*—Patrick N. Burkhart
*Attorney, Agent, or Firm*—Oldham, Oldham & Weber Co.

[57] ABSTRACT

A hand-operated sprayer has a spray head for attachment to a container for liquid. The spray head includes a manually-operable valve for controlling the discharge of liquid from an inlet in the head to a discharge nozzle. The sprayer includes a spring urging the valve into a closed position and a manually-operable member mounted on the head, which can be moved against the spring-loading to urge the valve into an open position. The valve comprises a spool having a passage providing communication between the inlet and the discharge nozzle, and the spray head valve spool-valve spool bore assembly has a radial inlet port located between a fixed, valve spool seating component, and an annular valve spool seal component which prevents external leakage. The positioning of the inlet port relative to such components is designed to prevent pressure from the sprayer container from accessing and, therefore, from acting on the spool head in a longitudinal direction when the sprayer is not in use thus permitting a smaller spring to be used to keep the sprayer closed. An annular seal of elastomeric material is also disposed in the bore surrounding the spool, and in frictional engagement with it.

9 Claims, 2 Drawing Figures

HAND-OPERATED SPRAYERS

Figure 1:
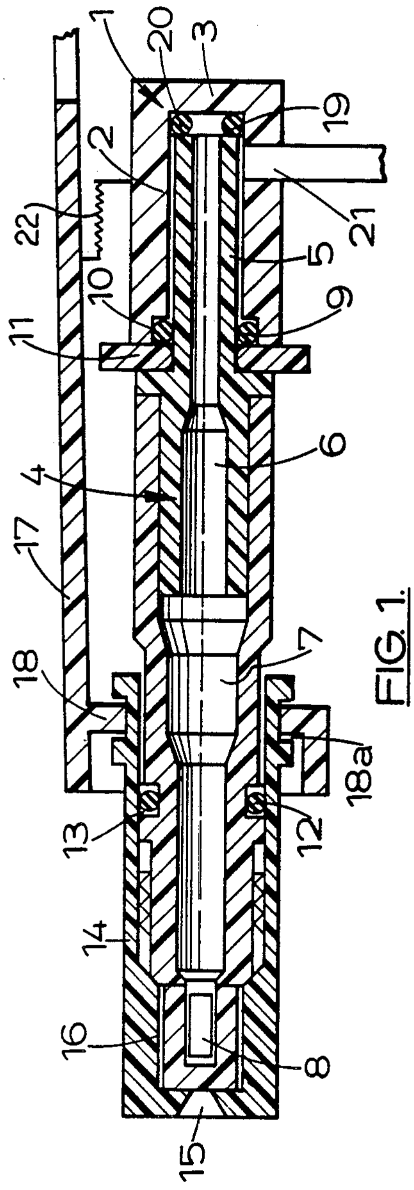

This invention relates to hand-operated sprayers of the kind comprising a spray head for attachment to a container for liquid, in which the spray head incorporates a manually-operable valve for controlling the discharge of liquid from an inlet in the head to a discharge nozzle.

In known sprayers of the kind set forth the valve usually comprises a valve member with which a spring co-operates to urge it into a closed position in engagement with a seating surrounding the inlet, and a manually-operable trigger mounted on the head is movable to urge the valve member away from the seating to open the valve against the loading in the spring.

In such known constructions the spring is adapted to hold the valve in the closed position with the valve member in engagement with the seating. In consequence in those constructions in which the pressure of fluid in the container acts on the valve member in a direction tending to urge it away from the seating, the spring has to be relatively strong to resist an opening force comprising the pressure acting over the area of the valve member.

According to our invention in a hand-operated sprayer of the kind set forth the valve comprises a spool guided for longitudinal movement in a bore in the head, the spool having a longitudinally extending passage adapted to provide communication between the inlet and the discharge nozzle, and a head defined by the end of the spool remote from the nozzle for engagement with a seating in the head to isolate the inlet from the passage in the spool, the sprayer also including a spring for urging the valve into a closed position in which the head is in engagement with the seating, an annular seal of elastomeric material disposed in the bore and surrounding the spool, the annular seal providing a seal between the bore and the spool and being adapted to prevent external leakage of liquid from the bore, and a manually-operable member for moving the valve into an open position against the force in the spring.

The annular seal is thus in frictional engagement with the spool, and this increases the resistance to movement of the spool with respect to the bore in both directions between the open and closed positions. This enables us to choose a spring, the strength of which can comfortably be overcome by a manual force applied to the manually-operable member, thereby facilitating operation, but the spring must be sufficiently strong to overcome any pressure of liquid acting on the head at least during movement of the head towards the seating.

Preferably the inlet comprises a radial port leading to the bore, the port being located in an axial position between the seal and the seating. The seal therefore prevents external leakage of liquid from the inlet when the valve is in its closed position. Since the annular seal is subjected at all times to any pressure in the container the sealing effect, and in consequence the frictional engagement of the seal with the spool, is enhanced by the pressure acting on it.

Preferably the annular seal is housed in a radial retaining groove in the wall of the bore and the spool is guided to slide through the seal. This has the advantage that any tolerance variations between the spool and the bore are accommodated by the annular seal, and it is not necessary to provide a high surface finish on the complementary surfaces of the bore and the spool since they do not engage directly.

The head may comprise a plain face at the end of the spool, and the seating may comprise a resilient member supported by a wall at a closed inner end of the bore. In such a construction the head may be of relatively small diameter. This reduces to a minimum the force, comprising the pressure acting over the area of the spool, which urges the spool away from the seating, thereby enabling us to provide a relatively lighter spring.

The nozzle may comprise a separate member screwed onto the outer end portion of the spool. A second annular seal of elastomeric material may be disposed between the nozzle and the spool to prevent the external escape of liquid except through the nozzle.

The longitudinal passage in the spool may be closed at its outer end and may communicate with the nozzle through one or more radial ports in the spool.

The spool may be constructed from two separate parts with a first part being guided to slide in the longitudinal bore, and the second part carrying the second annular seal and receiving the nozzle in a screw-threaded engagement.

Figure 2:
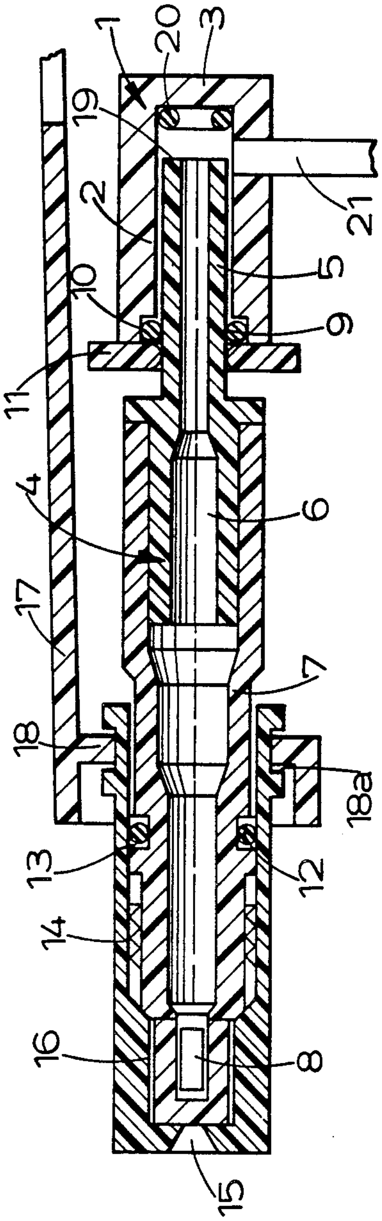

One embodiment of our invention is illustrated in the accompanying drawings in which:

FIG. 1 is a longitudinal section through a portion of a hand-operated sprayer with a manually-operable valve in a closed position; and FIG. 2 is similar to FIG. 1 but showing the valve in an open position.

The portion of the sprayer illustrated in the drawings is adapted for mounting on a container for liquid. The portion comprises a spray head 1 including a longitudinally extending bore 2 which is closed at its inner end by a wall 3, and a manually-operable valve including a two-part spool assembly 4, for controlling discharge of liquid from an inlet 21 to a discharge nozzle 14.

The spool assembly 4 comprises a spool 5 which works in the bore 2 and has a longitudinally extending passage 6, and a hollow forward extension 7 which is closed at its forward end but which is provided adjacent to that end with a pair of diametrically arranged ports 8. A first sealing '0' ring 9 of elastomeric material is received in a radial groove 10 defined between the open outer end of the bore 2 and a retainer 11, so that it surrounds the spool 5 and is in frictional engagement with it. A second sealing '0' ring 12 of elastomeric material is received in a radial groove 13 provided in the extension 7 in a position inwardly of the ports 8 to seal against the wall of the nozzle 14, which is screwed onto the outer end of the extension 7. The nozzle 14 has a central discharge opening 15 with which the ports 8 communicate through a clearance 16 between the extension 7 and nozzle and a swirl slot (not shown) in the adjacent closed end of the extension 7.

A manually-operable member in the form of a trigger 17 fits over the spray head 1, and is coupled to the nozzle 14 by means of a fork 18 which is received in annular recess 18*a* in the nozzle 14. A spring (shown) diagrammatically by 22 in FIG. 1) acts between the head 1 and the trigger 17 normally to hold the valve in a closed position as shown in FIG. 1 with a head 19 comprising the plain inner end of the spool 5 in engagement with a seating comprising an '0' ring seal 20 of elastomeric material supported by the wall 3 at the closed inner end of the bore 2. In this position the radial inlet 21 in the wall of the head 1 is isolated from the passage 6, and external leakage of liquid from the space between the spool 5 and the bore 2 is prevented by the seal 9.

When the trigger 17 is operated manually against the force in the spring, the force holding the head 19 against the seating 20 is relieved but the valve will not normally open until the trigger 17 physically applies a force to the spool 5 via the nozzle 14 in that direction, in order to overcome the frictional engagement of the seal 9 with the spool 5. As the head 19 moves away from the seating 20 into the position shown in FIG. 2, pressurised fluid in the container acts over the area of the head 19, which comprises a relatively small annular area surrounding the bore 6, to augment the opening force and such liquid also passes from the nozzle through the bore 6 and the radial ports 8, to be discharged through the opening 15 in the nozzle. External leakage of liquid from the space between the nozzle 14 and the extension 7 is prevented by the provision of the sealing ring 12.

The spray head described above can be incorporated in a hand-operated sprayer of the pressurised liquid type forming the subject of our pending Patent Applications GB-A-2084258 and 8313900.

I claim:

1. A hand-operated sprayer comprising a spray head for attachment to a container for liquid and having an inlet for liquid, a discharge nozzle, a bore, and a valve seating at a closed inlet end of said bore, and a manually-operable valve incorporated in said head for controlling the discharge of liquid from said inlet to said discharge nozzle, wherein said valve comprises a spool guided for longitudinal movement in said bore in said head, said spool having a longitudinally extending passage adapted to provide communication between said inlet and said discharge nozzle, and a head defined by the end of said spool remote from said nozzle for making sealing engagement against said valve seating to isolate said inlet from said passage in said spool, said sprayer also including a spring for urging said valve into a closed position in which said head is in sealing engagement with said valve seating, an annular seal of elastomeric material supported in a wall of said bore and surrounding said spool which is guided to slide through said seal, said annular seal providing a seal between said bore and said spool and being adapted to prevent external leakage of liquid from said bore, and a manually-operable member for moving said valve into an open position against the force in said spring, wherein said inlet comprises a radial port leading to said bore, said port being located in an axial position between said seal and said valve seating, whereby when the valve is in the closed position thereof fluid pressure in the inlet does not urge the spool longitudinally.

2. A hand-operated sprayer as claimed in claim 1, wherein said annular seal is housed in a radial retaining groove in the wall of said bore.

3. A hand-operated sprayer as claimed in claim 1, wherein said head comprises a plain annular face at said end of the spool, and said seating comprises a resilient annular member supported at said closed inner end of said bore.

4. A hand-operated sprayer as claimed in claim 3, wherein said head is of relatively small diameter.

5. A hand-operated sprayer as claimed in claim 1, wherein said spool has an outer end portion, and said nozzle comprises a separate member screwed onto said outer end portion of said spool.

6. A hand-operated sprayer as claimed in claim 5, wherein a second annular seal of elastomeric material is disposed between said nozzle and said spool.

7. A hand-operated sprayer as claimed in claim 1, wherein said longitudinal passage in said spool is closed at its outer end, and communicates with the nozzle through at least one radial port in said spool.

8. A hand-operated sprayer as claimed in claim 1, wherein said spool is constructed from two separate parts, with a first part guided to slide in said longitudinal bore, and a second part receiving said nozzle in screw-threaded engagement.

9. A hand-operated sprayer as claimed in claim 8, wherein said second part of said spool carries said second annular seal.

* * * * *